US011949476B2

(12) United States Patent
Volodymyrovych et al.

(10) Patent No.: US 11,949,476 B2
(45) Date of Patent: Apr. 2, 2024

(54) SAFETY OR CONTROL SYSTEM AND A METHOD FOR A RADIO COMMUNICATION AMONG A PLURALITY OF TRANSCEIVERS OF SUCH SYSTEM

(71) Applicant: AJAX SYSTEMS CYPRUS HOLDINGS LTD, Nicosia (CY)

(72) Inventors: Konotopskyi Oleksandr Volodymyrovych, Sharjah (AE); Tantsiura Oleksandr Mykolayovych, Kyiv (UA); Piannikov Serhii Dmytrovych, Kyiv (UA)

(73) Assignee: AJAX SYSTEMS CYPRUS HOLDINGS LTD, Nicosia (CY)

( * ) Notice: Subject to any disclaimer, the term of this patent is extended or adjusted under 35 U.S.C. 154(b) by 397 days.

(21) Appl. No.: 17/446,403

(22) Filed: Aug. 30, 2021

(65) Prior Publication Data

US 2022/0069872 A1 Mar. 3, 2022

(30) Foreign Application Priority Data

Sep. 3, 2020 (UA) .............................. a 2020 05679

(51) Int. Cl.
*H04B 7/06* (2006.01)
*H04W 56/00* (2009.01)
*H04W 4/38* (2018.01)

(52) U.S. Cl.
CPC ........ *H04B 7/0608* (2013.01); *H04W 56/001* (2013.01); *H04W 4/38* (2018.02)

(58) Field of Classification Search
None
See application file for complete search history.

(56) References Cited

U.S. PATENT DOCUMENTS 6,473,619 B1 * 10/2002 Kong ..................... H04W 64/00
455/457
7,277,686 B2 * 10/2007 Gierl ....................... H04B 7/12
455/161.3
(Continued)

OTHER PUBLICATIONS

Johnsrud, S. et al., "Antenna Diversity," *Application Report*, Oct. 2014, pp. 1-10, Texas Instruments.

*Primary Examiner* — Nicholas Sloms
(74) *Attorney, Agent, or Firm* — Saliwanchik, Lloyd & Eisenschenk (57) ABSTRACT

The invention relates to safety or control systems for a plurality of sensors. In particular, the invention relates to networks for transmitting measured parameters, control or similar signals by modeling signals at carrier frequencies using a wireless electric communication, preferably, using a radio communication.

A method for a radio communication among a plurality of transceivers of a safety or control system comprises broadcasting a radio signal, which comprises at least a preamble and a packet body, and searching for the preamble through a plurality of antennas k1 of one transceiver with an alternate periodical linking of each antenna to search for the preamble followed by evaluating a quality of the radio signal as compared to a given level of the radio signal upon receipt of the preamble and selecting an antenna having a maximum level of the radio signal, through which a synchronization of the transceivers is started to receive the packet body. Therewith, during the broadcasting of the radio signal, a radio frequency is periodically switched among a set of given radio frequencies k2, while during the alternate periodical linking of each antenna to search for the preamble, the radio frequency is periodically switched among the radio frequencies from the set of given radio frequencies k2 for the linked antenna, wherein a minimum duration of the preamble for (Continued)

the broadcasting of the radio signal is determined by a ratio $T1=(k1+k2)T$, where $T1$ is a duration of the preamble broadcasting in msec, T is a duration of linking of one antenna of the transceiver at a single radio frequency in msec, wherein upon receipt of the preamble during selecting of the antenna having the maximum level of the radio signal, a frequency, at which the preamble has been received, is assigned as a reference (carrier) frequency followed by synchronization of the transceivers through the selected antenna and the reference frequency. Also, a safety or control system, wherein the described method is implemented, is claimed.

14 Claims, 11 Drawing Sheets

(56) References Cited

U.S. PATENT DOCUMENTS

| | | | | |
|---|---|---|---|---|
| 9,893,760 B2* | 2/2018 | Mushkin | ............. | H04B 1/7136 |
| 2005/0153723 A1* | 7/2005 | Hosur | ................. | H04W 88/08 |
| | | | | 455/515 |
| 2006/0067205 A1* | 3/2006 | Jung | .................... | H04B 7/0678 |
| | | | | 375/E1.037 |
| 2007/0139183 A1* | 6/2007 | Kates | .................. | G08B 25/005 |
| | | | | 340/539.22 |
| 2008/0182512 A1* | 7/2008 | Waters | ................ | H04B 7/0817 |
| | | | | 455/41.1 |
| 2009/0067370 A1* | 3/2009 | Kim | .................... | H04J 11/0073 |
| | | | | 455/434 |
| 2009/0122882 A1* | 5/2009 | Mujtaba | ............... | H04L 27/261 |
| | | | | 375/260 |
| 2014/0146742 A1* | 5/2014 | Khandekar | .......... | H04W 48/16 |
| | | | | 370/328 |
| 2014/0355628 A1* | 12/2014 | Akhlaq | .............. | H04W 56/001 |
| | | | | 370/509 |
| 2015/0207553 A1* | 7/2015 | Watanabe | ............ | H04W 24/08 |
| | | | | 370/252 |
| 2021/0051658 A1* | 2/2021 | Park | ...................... | H04W 16/14 |
| 2021/0144601 A1* | 5/2021 | Kazmi | ............... | H04W 36/0088 |

* cited by examiner

SAFETY OR CONTROL SYSTEM AND A METHOD FOR A RADIO COMMUNICATION AMONG A PLURALITY OF TRANSCEIVERS OF SUCH SYSTEM

CROSS-REFERENCE TO RELATED APPLICATION

This application claims priority to Ukrainian Application No. a 2020 05679, filed Sep. 3, 2020, which is hereby incorporated by reference in its entirety.

FIELD OF USE

The invention relates to safety or control systems for a plurality of sensors. In particular, the invention relates to networks for transmitting measured parameters, control or similar signals by modeling signals at carrier frequencies using a wireless electric communication, preferably, using a radio communication.

Safety, control and site guarding systems include a plurality of sensors to measure parameters (movement sensors, shock sensors, volume sensors, gas leakage sensors, flood sensors, fire, light and sound annunciators) and other appliances for fixation of a state of the environment, such as video cameras etc. The sensors are designed as transceivers for measured parameters by means of radio signals with data packets to servers and other communication and operation equipment that is comprised within said systems. The sensors transmit data at one or several radio channels. To this end, at least one of a set of transceivers of such system comprises a radio module that is coupled to an antenna and a microcontroller that is coupled to the radio module. The microcontroller processes radio signals received by the radio module through the antenna in order to receive the data packets from the sensors.

There is a problem of lowering a confidence level of transmission of signals within wireless networks of such systems. Usually, such problem is associated with occurrence of conditions, which complicate the receipt of the radio signal, such as interference holes, which are formed due to a multiple reflection of electromagnetic waves from a large number of interferences at their path (room walls, furniture or people therein etc.). Such problem is solved by spatially diverted antennas of the transceiver that receives signals from the sensors. Such a technology is known as "Antenna Diversity" (Siri Johnsrud and Sverre Hellan, Texas Instruments Incorporated: Antenna Diversity, Application Report SWRA469, October 2014, access mode—http://www.b.com/lit/an/swra469/swra469.pdf) and enables to increase reliability of the radio communication and to increase a probability of delivery of data packets for a specific sensor, annunciator or fixation appliance in the conditions of instable radio reception.

For example, implementation of a diverted reception and transmission of the radio signal by the company Texas Instruments Incorporated is known from the publication Application Report, SWRA523B—September 2016—Revised March 2017, CC13xx Antenna Diversity, March 2017.

Even in case of using the transceiver with the spatially diverted antennas, another problem remains unsolved that lies in reduction of reliability of transmission of signals and associated with occupation of an operation frequency, at which the transceivers of the safety, control and site guarding system exchange radio signals. A reason for the occupation of the operation frequency may be another system that is located nearby and operates at the same frequency, as well as other factors.

Figure 1:
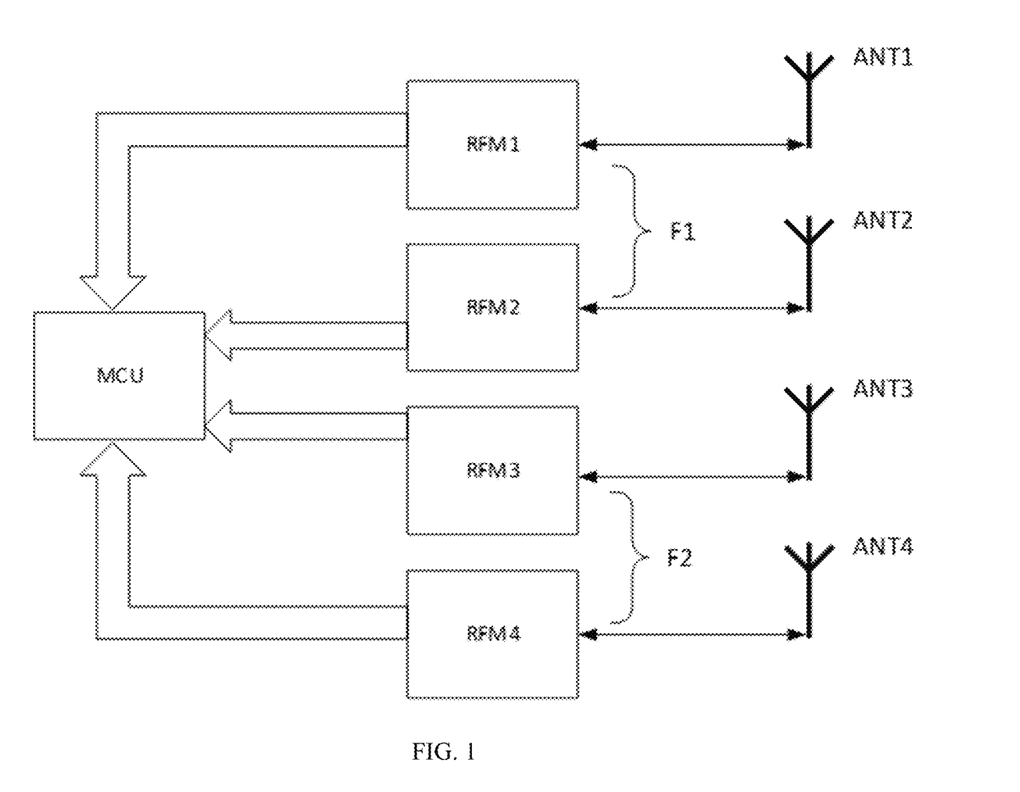
FIG. 1 is a diagram of the transceiver having four independent radio channels that is selected as an analogue of the proposed solution.

Said problem of occupation of the operation frequency is solved by creating additional radio channels, thereby increasing the reliability of transmission of signals within the safety or control system. One of such obvious solutions lies in use of a transceiver having four independent radio channels. To this end, the transceiver has, for each radio channel, a separate radio module that is coupled to a separate antenna. An example of such transceiver is presented in FIG. 1, where MCU is a microcontroller, RFM1-RFM4 are separated radio modules, ANT1-ANT4 are separated antennas, which are coupled to the corresponding radio modules RFM1-RFM4, F1 is a radio frequency, at which the RFM1 from the ANT1 and the RFM2 from the ANT2 operate; F2 is a radio frequency, at which the RFM3 from the ANT3 and the RFM4 from the ANT4 operate. That is, each radio module RFM1-RFM4 operates with the separate antenna/frequency. Hence, such transceiver operates at four independent radio channels: F1ANT1, F1ANT2, F2ANT3, F2ANT4, thereby solving the problem of the occupation of the operation frequency. Drawbacks of such solutions lie in a high prime cost of the transceiver that is caused by the simultaneous use of four radio modules and antennas corresponding thereto, as well as larger dimensions of the transceiver and commutation costs.

The invention is based on a task to develop a method for a radio communication among a plurality of transceivers of such system that could eliminate the problem of occupation of the operation frequency and could be simultaneously implemented by means of smaller number of radio signal reception/transmission elements (simplification of the transceiver structure as compared to the direct and obvious solution of this problem). Implementation of such a method will lead to reduction of dimensions of the transceiver and, hence, of its prime cost. A further task is to increase a speed for determining a preamble and subsequent reception of a packet body.

The posed task is resolved in that in a method for a radio communication among a plurality of transceivers of a safety or control system, which comprises broadcasting a radio signal, which comprises at least a preamble and a packet body, and searching for the preamble through a plurality of antennas k1 of one transceiver with an alternate periodical linking of each antenna to search for the preamble followed by evaluating a quality of the radio signal as compared to a given level of the radio signal upon receipt of the preamble and selecting an antenna having a maximum level of the radio signal, through which a synchronization of the transceivers is started to receive the packet body, according to the invention, during the broadcasting of the radio signal, a radio frequency is periodically switched among a set of given radio frequencies k2, while during the alternate periodical linking of each antenna to search for the preamble, the radio frequency is periodically switched among the radio frequencies from the set of given radio frequencies k2 for the linked antenna, wherein a minimum duration of the preamble for the broadcasting of the radio signal is determined by a ratio $T1=(k1+k2) T$, where $T1$ is a duration of the preamble broadcasting in msec, $T$ is a duration of linking of one antenna of the transceiver at a single radio frequency in msec, wherein upon receipt of the preamble during selecting of the antenna having the maximum level of the radio signal, a frequency, at which the preamble has been received, is assigned as a reference (carrier) frequency followed by synchronization of the transceivers through the selected antenna and the reference frequency.

The above-described method enables to achieve an effect of four independent channels (as in the method utilizing a separate radio module having a separate antenna for each radio channel), but by means of a single radio module and two antennas. Therefore, the cost of the transceiver is reduced (in case of using four radio modules, the transceiver is simplified to three radio modules and two antennas), as well as dimensions of the device are reduced. Therewith, the method for the radio communication among the plurality of the transceivers using such transceiver eliminates the problem of occupation of the operation frequency and increases the reliability of the radio communication within the safety or control system.

The microcontroller, with a certain interval, issues a command to a commutator for switching the antenna (the alternate periodical linking of each antenna to search for the preamble). In each of these time periods, the microcontroller is aware of the antenna, which it operates with (which antenna performs receiving at the present moment), and analyzes a state of an ether by comparing it with the current receiving antenna in order to evaluate the quality of the radio signal as compared to the given level of the radio signal upon receipt of the preamble and selection of the antenna having the maximum level of the radio signal, through which the synchronization of the transceivers is started to receive the packet body.

Upon comparison of the proposed method with the method for diverted reception and transmission of the radio signal by the company Texas Instruments Incorporated (the above-mentioned publication Application Report, SWRA523B—September 2016—Revised March 2017, CC13xx Antenna Diversity, March 2017), the following has been found. In the method of the company Texas Instruments, if a first antenna misses an expected preamble and the signal level is found to be too low for receipt at a second antenna, then a repetition of receiving the preamble will take two time intervals (slots). After the preamble has been found, it is required to check its receipt at the second antenna again. It leads to a loss of four time intervals and significantly reduces the preamble determination speed. According to the proposed method, only two periods are used to determine the preamble: a first period for receiving the preamble and a second period for checking at the second antenna. Afterwards, the antenna having the maximum level of radio signal, at which the preamble has been received, thereby enabling to perform the receipt of a synchro-word immediately. Therewith, it is not required to check for the preamble presence once again, and it is possible to start receiving the packet body. In such way, the preamble determination and the packet body receipt speed is increased as compared to the known method of the company Texas Instruments Incorporated.

According to one of preferable embodiments of the method, the transceiver having the plurality of antennas k1, which equals to 2, is used. In this case, the set of the given radio frequencies k2 of the transceiver equals to 2.

According to another preferable embodiment of the method, the evaluation of the quality of the radio signal comprises a cyclic determination of the signal level at a current moment followed by a formation of an array of signal levels and determination of a noise level among all the frequencies from the set of the given radio frequencies k2.

According to one of preferable embodiments of the method, the evaluation of the quality of the radio signal comprises switching from the antenna that has received the preamble to another antenna in order to compare the signal level followed by selection of the antenna having the maximum level of the radio signal.

According to one of preferable embodiments of the method, the synchronization of the transceivers comprises waiting for the synchro-word by the transceiver that has received the preamble during the period T2 followed by reception of the packet body during the period T3.

According to the previous embodiment of the method, the cyclic search for the preamble is started after the period T2 has expired and in absence of the synchro-word or after the period T3 has expired.

The invention is also based on a task to develop a system for a radio communication among a plurality of transceivers to implement the above-described method. The system must eliminate the problem of occupation of the operation frequency and, at the same time, it must be based on a transceiver having smaller number of elements, which are required for the reception/transmission of the radio signal (simplification of the transceiver structure and reduction of its dimensions and prime cost).

Such task is resolved by the fact that the safety or control system, wherein a data exchange is performed according to the above-mentioned method, comprises a plurality of transceivers, each of them being configured to receive and transmit the radio signal, and at least one of them comprises a radio module that is coupled to a high-frequency commutator that has a set of outputs that is coupled to the plurality of antennas k1, and a microcontroller that is coupled to the radio module and to the high-frequency commutator, wherein the radio module is configured to operate at radio frequencies k2, and the microcontroller is configured to periodically perform a cycle of searching for the preamble by: loading the radio frequency from the set of given radio frequencies k2 to the radio module, linking an antenna from the plurality of antennas k1 through the high-frequency commutator followed by searching for the preamble at the established radio frequency through the linked antenna, linking another antenna from the plurality of antennas k1 followed by searching for the preamble at the preliminary established radio frequency through the linked antenna, loading another radio frequency from the set of given radio frequencies k2 to the radio module followed by searching for the preamble at the established radio frequency through the preliminary linked antenna, linking another antenna from the plurality of antennas k1 followed by searching for the preamble at the established radio frequency through the linked antenna, selecting the antenna having the maximum level of the radio signal, at which the preamble has been received, and assigning the frequency, at which the preamble has been received, as the reference (carrier) frequency followed by synchronization of the transceivers through the selected antenna and the reference frequency. Therewith, other transceivers from the plurality of the transceivers are configured to broadcast the radio signal comprising at least the preamble and the packet body, wherein the minimum duration of the preamble for the broadcasting of the radio signal is determined by the ratio $T1=(k1+k2) T$, where $T1$ is the duration of the preamble broadcasting in msec, $T$ is the duration of linking of one antenna of the transceiver at a single radio frequency in msec.

According to one of preferable embodiments of the system, the transceiver comprises the microcontroller having the plurality of antennas k1, which equals to 2, and the set of given radio frequencies k2, which equals to 2.

According to another one of preferable embodiments of the system, the microcontroller is configured to evaluate the quality of the radio signal by cyclic determination of the signal level at a current moment followed by the formation of an array of signal levels and determination of a noise level among all the frequencies from the set of the given radio frequencies k2.

According to another one of preferable embodiments of the system, the microcontroller is configured to switch the antenna that has received the preamble to another antenna in order to compare the signal level followed by selection of the antenna having the maximum level of the radio signal.

According to another one of preferable embodiments of the system, the microcontroller is configured to establish the period T2 for waiting for the synchro-word by the transceiver that has received the preamble and the period T3 for receiving the packet body.

According to the previous embodiment of the system, the microcontroller is configured to restore the cycle of searching for the preamble after the period T2 has expired and in absence of the synchro-word or after the period T3 has expired.

The invention is illustrated with the following exemplary embodiment of the safety or control system and the method for radio communication among the plurality of transceivers of such system. List of drawings.

The presented examples do not limit other possible embodiments of the invention, rather they merely explain the essence thereof.

In FIGS. 1-9, the following designations are used:
(1)—the transceiver (the sensor),
(2)—the transceiver (a receiver of the sensor radio signal),
(3)—the radio module,
(4)—the high-frequency commutator,
(5)—the plurality of antennas k1 of the transceiver (2),
(6)—the microcontroller.

The safety or control system (FIG. 2) comprises the plurality of transceivers (1) and (2), each of them being configured to receive and transmit the radio signal. The plurality of transceivers (1) and (2) comprises sensors (1) and the radio signal receiver (2) to receive the radio signal from the sensors (1). The sensors (1) may represent movement sensors, door opening sensors, smoke sensors and other similar ones. Each of the sensors (1) comprises the radio frequency module and the antenna. The radio signal receiver (2) is a device that receives the radio signal having a data packet from the sensors (1) of the separate safety or control system, processes the received data packet and forms the radio signal in response to the sensor (1), from which the packet has been received.

Figure 2:
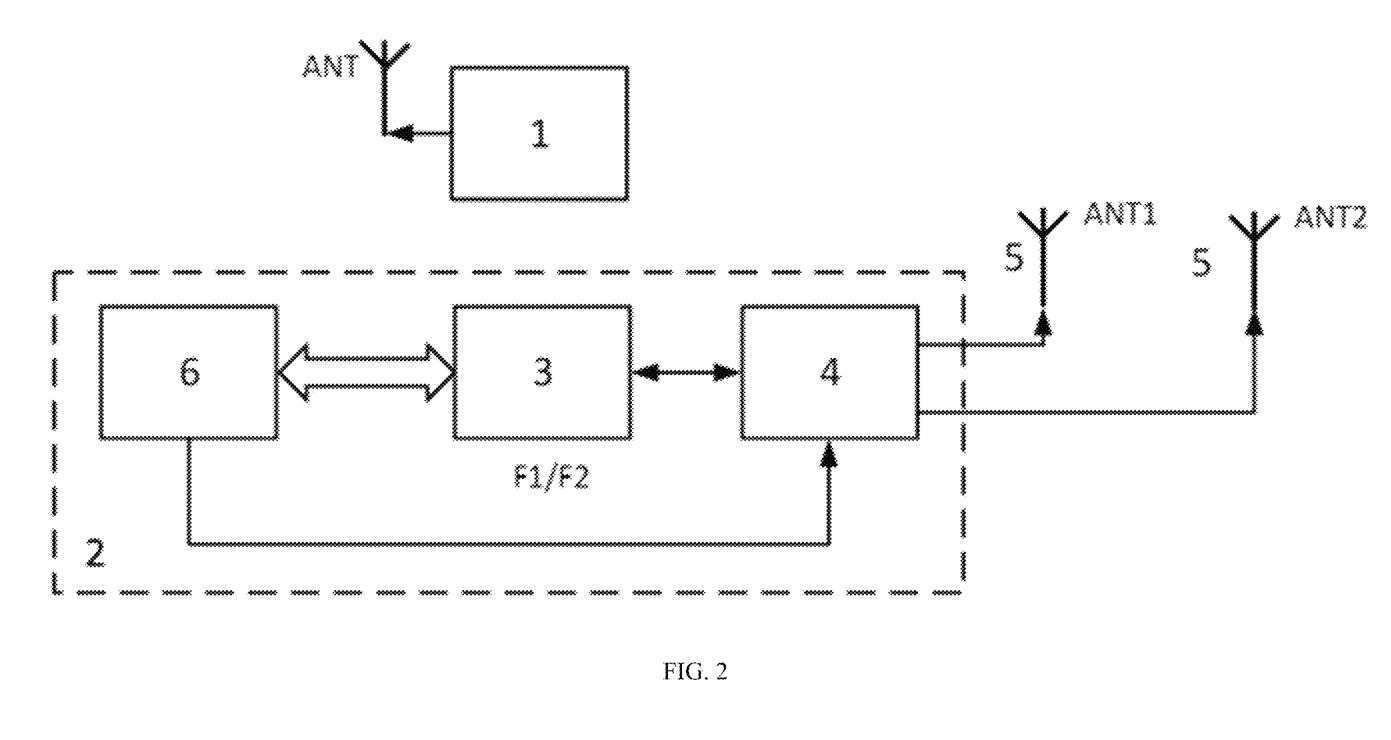
FIG. 2 is a diagram of the transceiver (2), according to the invention.

The radio signal receiver (2) comprises the radio module (3) that is coupled to the high-frequency commutator (4) having a set of outputs that is coupled to the plurality of antennas k1 (5). FIG. 2 depicts an example of the radio signal receiver (2) having the plurality of antennas k1=2 (antennas ANT 1 and ANT 2). The radio module (3) is also coupled to the microcontroller (6). The microcontroller (6) is designed to process radio signals, which come from the antennas (5) through the radio module (3). The microcontroller (6) comprises the set of given radio frequencies k2. In the example that is illustrated in FIG. 2, the microcontroller (6) comprising the set of given radio frequencies k2=2 (radio frequencies F1 and F2, according to the number of the antennas k1=2) is used. The microcontroller (6) is configured to periodically perform the cycle of searching for the preamble. In order to perform the cycle of searching for the preamble, the microcontroller (6) is programmed to perform the following: (1) loading the radio frequency F1 or F2 from the set of given radio frequencies F1 and F2 to the radio module (3), e.g., the frequency F1; (ii) linking the antenna ANT 1 or ANT 2 from the plurality of antennas (4) through the high-frequency commutator (4) followed by searching for the preamble at the established radio frequency F1 through the linked antenna (5), e.g., the antenna ANT 1; (iii) linking another antenna (5) from the plurality of antennas (5), correspondingly, the antenna ANT 2, followed by searching for the preamble at the preliminary established radio frequency F1 through the linked antenna (5); (iv) loading another radio frequency from the set of given radio frequencies, correspondingly, the radio frequency F2, to the radio module (3) followed by searching for the preamble at the established radio frequency F2 through the preliminary linked antenna ANT 2 (5); (v) linking another antenna ANT 1 (5) from the plurality of antennas (5) followed by searching for the preamble at the preliminary established radio frequency F2 through the linked antenna (5), (vi) selecting the antenna (5) having the maximum level of the radio signal, on which the preamble has been received (either ANT 1 or ANT 2), and assigning the frequency F1 or F2, at which the preamble has been received, as the reference (carrier) frequency followed by synchronization of the radio signal receiver (2) and the sensor (1), which the radio signal has been received from, through the selected antenna (5) and the reference frequency. The microcontroller (6) is programmed to evaluate the quality of the radio signal by cyclic determination of the signal level at a current moment followed by a formation of an array of signal levels and determination of a noise level among all the frequencies from the set of the given radio frequencies k2. The microcontroller (6) is programmed to switch the antenna (5) that has received the preamble to another antenna (5), e.g., from ANT 1 to ANT 2 or vice versa, in order to compare the signal level followed by selection of the antenna (5) having the maximum level of the radio signal. The microcontroller (6) is programmed to establish the period T2 for waiting for the synchro-word by the transceiver (2) that has received the preamble and the period T3 for receiving the packet body. The microcontroller (6) is programmed to restore the cycle of searching for the preamble after the period T2 has expired and in absence of the synchro-word or after the period T3 has expired.

Figure 3:
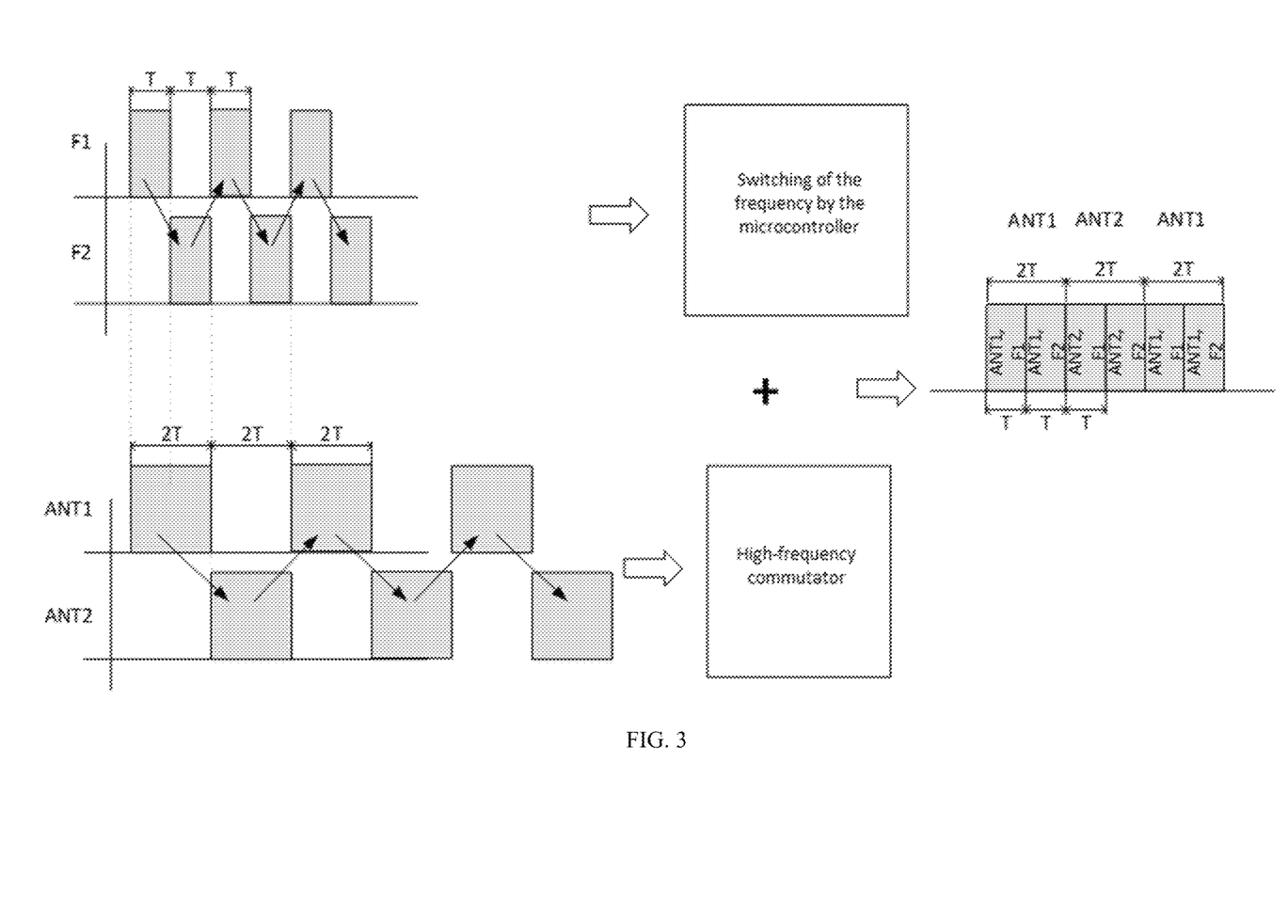
FIG. 3 is a time diagram of the radio communication process among the plurality of the transceivers.
Figure 5:
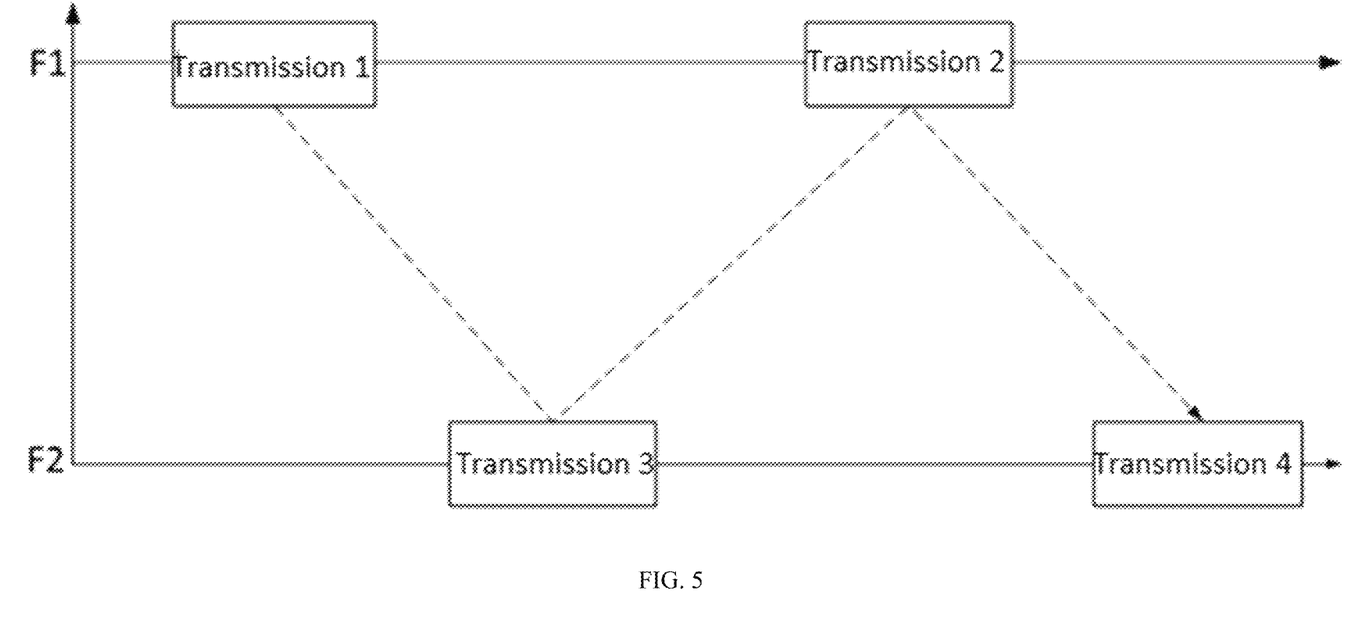
FIG. 5 is a time diagram that illustrates an example of switching the radio frequency among the set of given radio frequencies at the transceiver (1)

The method of the radio communication among the plurality of transceivers (1) and (2) in the above-described safety or control system is performed in the following way (FIG. 3). Such method implies broadcasting, by the transceiver (1), of the radio signal comprising at least the preamble and the packet body. During the broadcasting of the radio signal by the transceiver (1), the radio frequency among the set of given radio frequencies k2 is periodically switched, these are radio frequencies F1 and F2 for the illustrated example. FIG. 5 shows the cycle of the broadcasting of the preamble and the packet body: (i) transmission 1 at the frequency F2, (ii) switching to the frequency F1 and transmission 2 at the frequency F1, (iii) switching to the frequency F2 again and transmission 3 at the frequency F2, (iv) switching to the frequency F1 and transmission 4 at the frequency F1.

Therewith, the minimum duration of the preamble for broadcasting the radio signal is determined by the ratio T1=(k1+k2) T, where T1 is the duration of the preamble broadcasting in msec, T is the duration of linking of one antenna (5) of the transceiver (2) at a single radio frequency in msec. At the same time, the method implies searching for the preamble by the transceiver (2) through its plurality of antennas k1 (5). According to the example that is illustrated in FIG. 2, the searching is performed through the antennas ANT 1 and ANT 2 of the transceiver (2). For the searching for the preamble, each of the antennas ANT 1 and ANT 2 (5) are periodically linked. During the alternate linking of each antenna (5), the radio frequency is periodically switched among the radio frequencies from the set of given radio frequencies k2 (F1 and F2) for the linked antenna (5). After the preamble is received by the transceiver (2), the quality of the radio signal is evaluated as compared to the given level of the radio signal. The evaluation of the quality of the radio signal comprises the cyclic determination of the signal level at a current moment followed by a formation of an array of signal levels and determination of a noise level among all the frequencies from the set of the given radio frequencies k2. In order to compare the signal level, the antenna (5) that has received the preamble is switched to another antenna (5), afterwards, the antenna (5) having the maximum level of the radio signal (ANT 1 or ANT 2) is selected. When selecting the antenna (5) having the maximum level of the radio signal, the frequency, at which the preamble has been received (F1 or F2), is assigned as the reference (carrier) frequency followed by synchronization of the transceivers (1) and (2) for receiving the packet body through the selected antenna (5) and the reference frequency. The synchronization of the transceivers (1) and (2) comprises waiting for the synchro-word by the transceiver (2) that has received the preamble during the period T2 followed by reception of the packet body during the period T3. After the period T2 has expired and in absence of the synchro-word or after the period T3 has expired, the cyclic search for the preamble is started.

An exemplary search for the preamble of the packet by the transceiver (2), according to the claimed method, is as follows (FIG. 3): (i) the microcontroller (6) loads the frequency F1 to the radio module (3) and, through the high-frequency commutator (4), selects the antenna ANT1 (5), through which it starts to receive the radio signal; (ii) after the period T that equals to millisecond, the microcontroller (6) at the same frequency F1 switches to the antenna ANT2 (5) and starts to receive the radio signal through the antenna ANT2 (5); (iii) after millisecond, the microcontroller (6) re-loads the frequency F2 to the radio module (3) and, through the high-frequency commutator (4), selects the antenna ANT1 (5) and starts to receive the radio signal; (iv) after millisecond, the microcontroller (6) at the same frequency F2 switches to another antenna ANT2 (5) and starts to receive the radio signal. That is, the period T being the duration of linking of one antenna (5) of the transceiver (2) at the single frequency, in msec, is the period of switching the frequency or the antenna by the microcontroller (6). Thus, the reception of the radio signal through each antenna (ANT1) is performed continuously during the period that equals to 2T (FIG. 3). Therefore, according to the presented example, the simultaneous presence of the transceiver (2) at two radio frequencies is achieved only due to use of one radio module.

An exemplary use of such method for the radio communication for purposes of the safety or control system is as follows: (i) the transceiver (1), e.g., a door opening sensor, transmits an alarm signal (the radio signal) at one of the frequencies prescribed therein (F1 or F2); (ii) the alarm signal (the packet) comprises the preamble; (iii) the transceiver (2), being the radio signal receiver, listens to the signal at the frequencies prescribed therein (F1 and F2) through the antennas ANT1 and ANT2; (iv) if the transceiver (2) finds the signal of the sensor (of the transceiver (1)), it will fix the most powered signal and freezes the frequency and the antenna, and will further operate at this frequency and antenna until the end of a transaction (reception of the packet body); (v) if the packet is useful, then the transceiver (2) will form a response, turn on the transmission and transmit the response on the ether at the same frequency through the same antenna that has received the radio signal.

Figure 4:
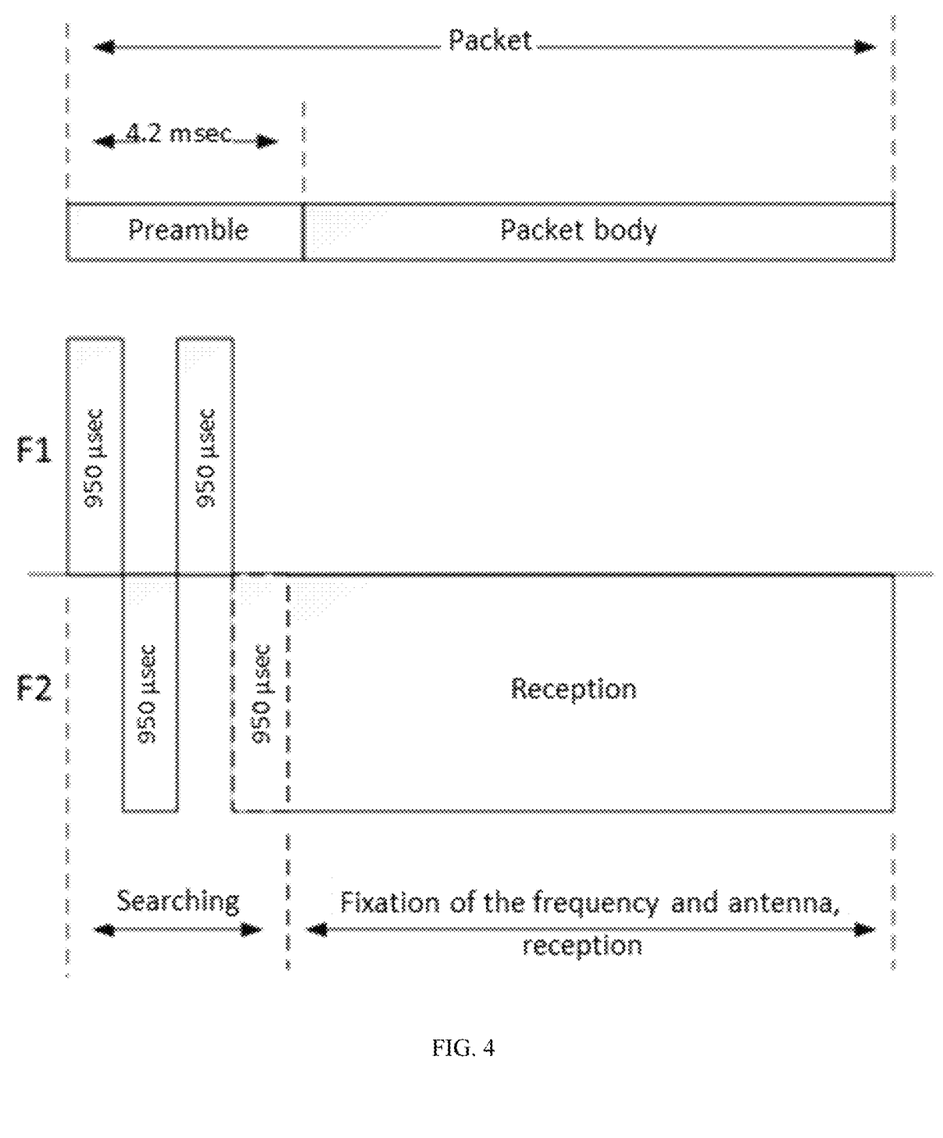
FIG. 4 is a structural diagram of the data packet that is transmitted during the radio communication among the plurality of transceivers (1) and (2)

The sensors (1) are configured to broadcast the radio signal comprising at least the preamble and the packet body. The minimum duration of the preamble for broadcasting the radio signal is determined by the ratio T1=(k1+k2) T, where T1 is the duration of the preamble broadcasting in msec, T is the duration of linking of one antenna of the transceiver at a single radio frequency in msec. Such selection of the duration of the preamble for the example, where k1 equals to 2 and k2 equals to 2, is illustrated in FIG. 4. In order for the packet from the transceiver (1) could be reliably listened in the ether by the transceiver (2), its preamble must be present in the ether at least during all the above-described cycles of switching among antennas and frequencies. For example, for the two frequencies F1 and F2 and two antennas ANT1 and ANT2, the preamble must be present in the ether at least during all four switching cycles: T1=(2+2)T→T1=4T). If T being the duration of linking of one antenna (5) of the transceiver (2) at the single frequency (the switching period) is 950 μsec (approximately 1 msec), then the minimum duration of the preamble will be T1=4×950 μsec=3.8 msec. For the case of testing the safety and control system, according to the provided example, the 10 bytes preamble was selected that corresponds to its duration of 4.2 msec (speed is 19200 bps).

Figure 6A:
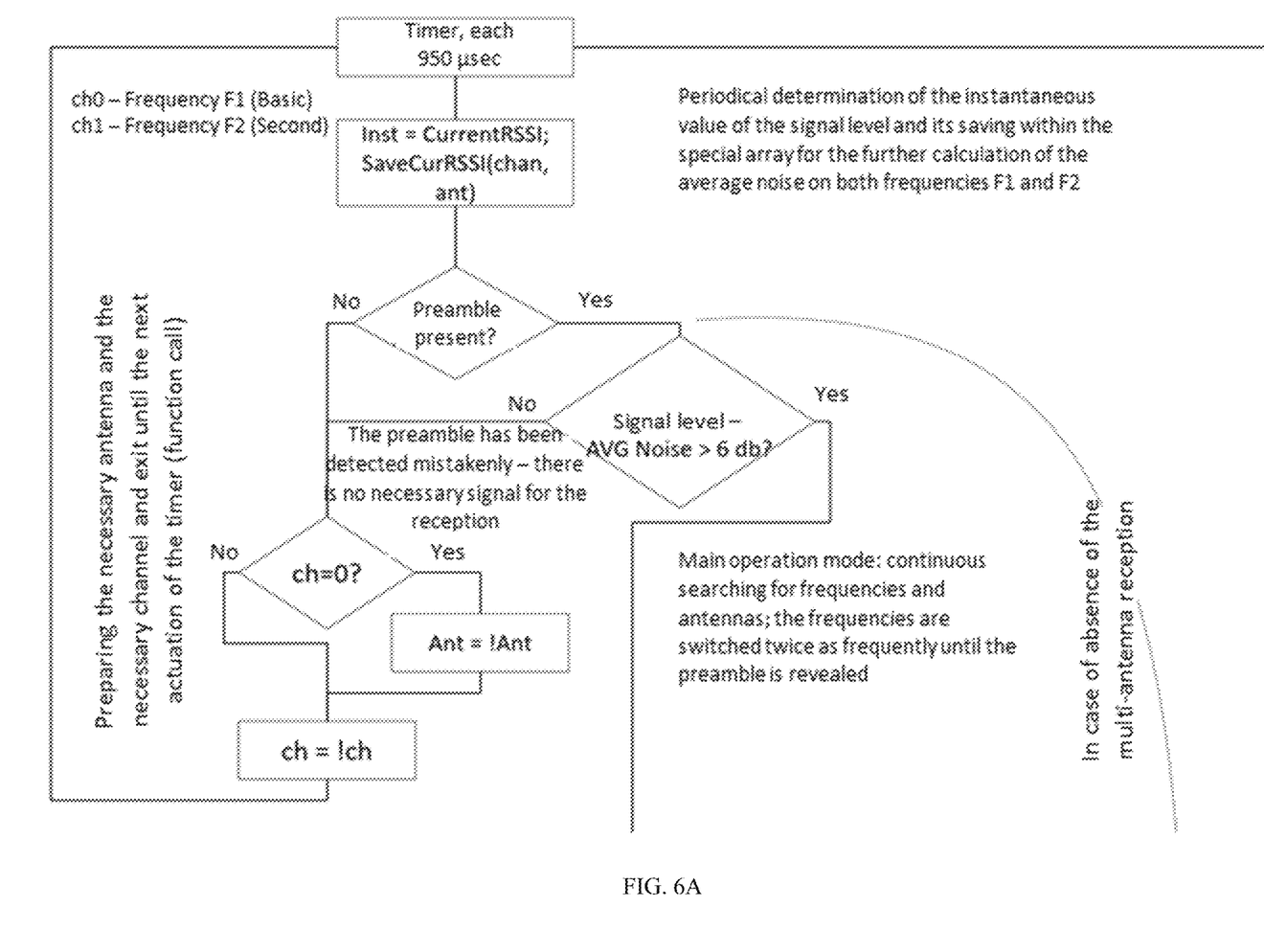
FIGS. 6A-6C are block diagrams of the operation of the transceiver (2) during the multi-frequent receipt of the radio signal.
Figure 6B:
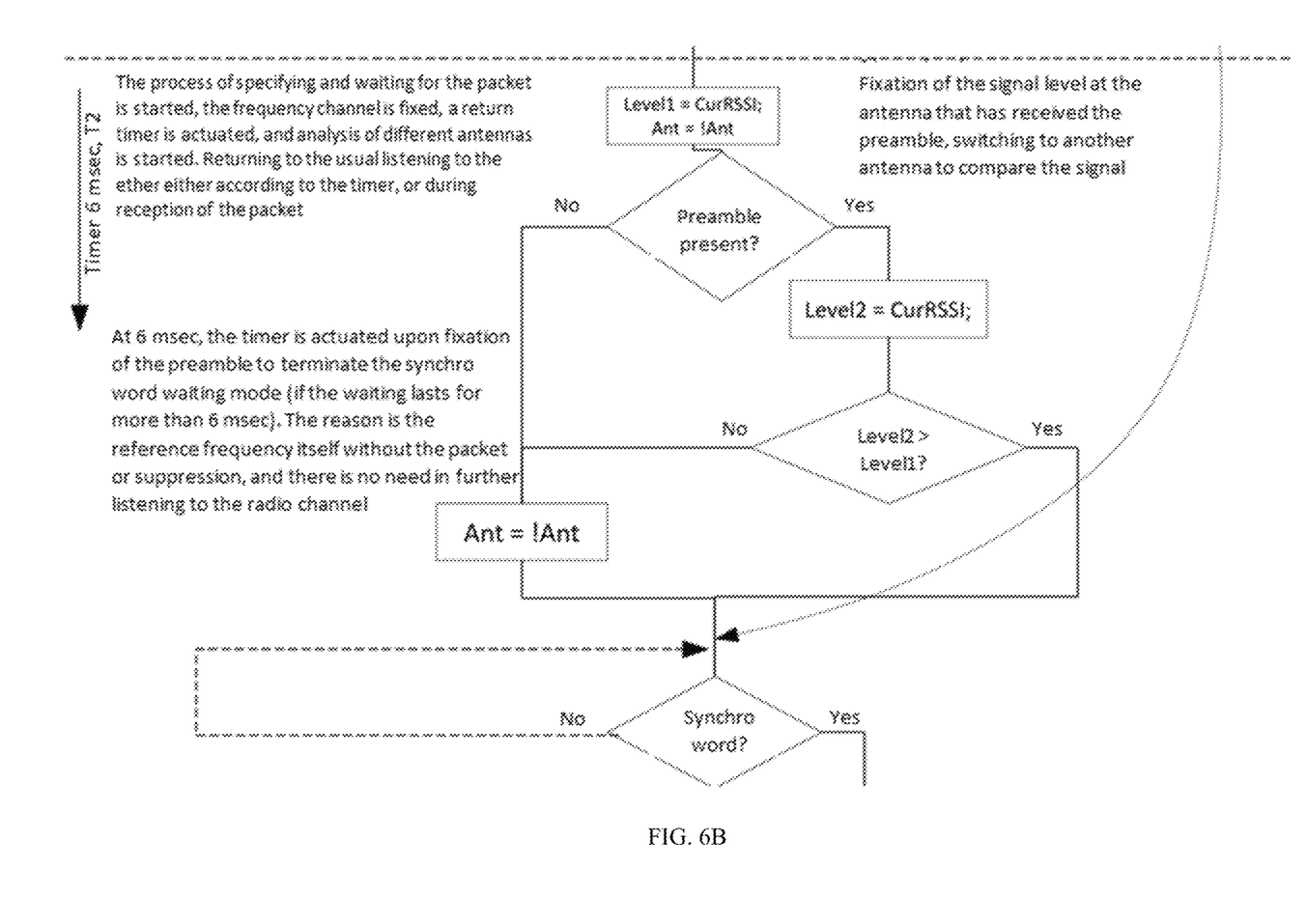
Figure 6C:
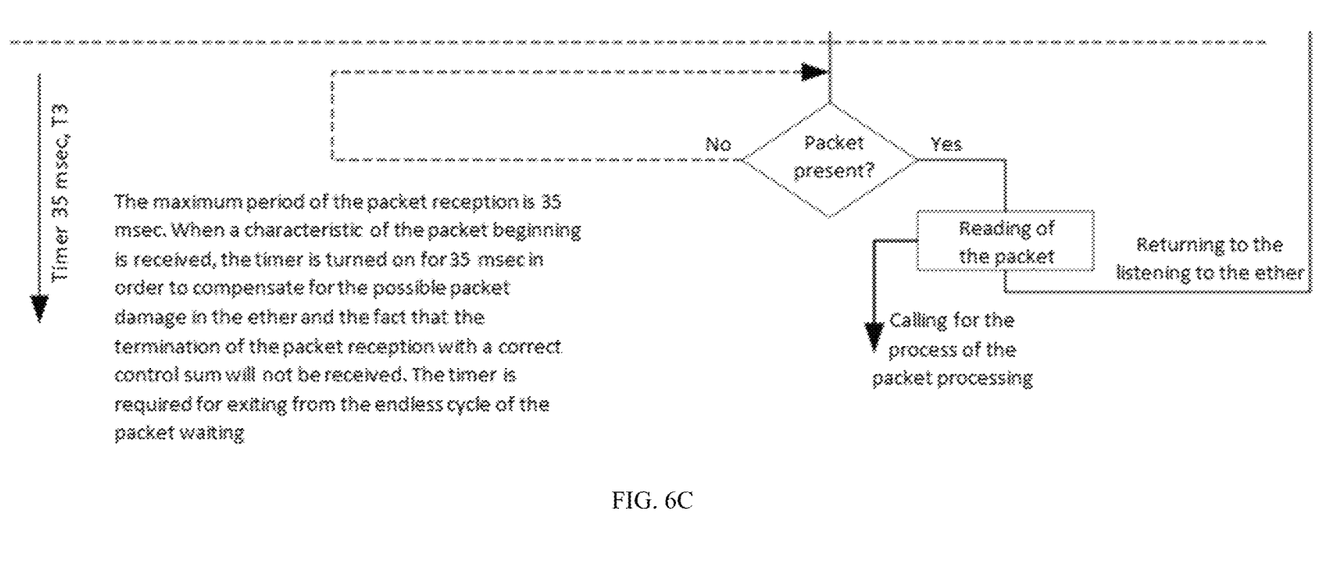

Main steps of this process in FIGS. 6A-6C are (1) the alternate periodical switching of the antennas and the frequencies by the microcontroller (6) until the reference (carrier) frequency is fixed in the ether, since the broadcasting of the radio signal with the preamble and the packet body is always performed by modulating the reference frequency; (ii) checking the reference (carrier) frequency at each of the antennas and selecting the best antenna (in terms of the signal level); (iii) after the selection, "freezing" the antenna and the frequency, afterwards the transceiver (2) waits for the synchro-word (the synchro-word is a code combination with data for an automatic recognition of the radio signal). The synchro-word is 0.82 msec in length, while the preamble is 4.2 msec in length, so a timeout of 6 msec (period T2) is turned on to wait for the synchro-word; (iv) if the synchro-word is not received by the transceiver (2) within this time, then the switching will be made "unfrozen" (the cyclic search for the preamble will be repeated) and the search for the reference frequency will be started again; (v) upon receipt of the synchro-word, a timeout of 35 msec is turned on (the maximum time for receiving the packet, period T3); (vi) upon receipt of the packet or expiration of the waiting time (period T2), performing the transition to the preamble (packet) search mode again.

Also, there may occur a situation of a so-called "stuck" of the transceiver (2) at a single frequency in case of suppressing by the preamble that has been received already (continuous listening to the ether on one radio channel only). In order for the transceiver (2) not to "stuck" on one radio channel in case of suppressing by the received preamble, the level of the received preamble must be 6 dB higher than the current noise level on this channel. In order to avoid this, a preamble suppression protection algorithm is used. In order to compare the noise and the useful signal, an averaging window having a size of 20 samples (msec) is taken. For example, if the noise level was −90 dB initially with the reference frequency of −40 dB appeared afterwards, then a difference of 50 dB occurs. Then, due to the averaging window, the average noise level tends to the level of the signal that is present in the ether, is averaged and becomes equal to −40 dB. The difference between the averaged noise −40 dB and the signal of the reference frequency −40 dB is 0 dB. Thus, this signal is dismissed, switching to another frequency is performed and supervision of this frequency is started. Until there is a considerable difference between the signal and the averaged noise level (>6 dB), the transceiver (2) will listen to the radio channel waiting for the packet. If the signal does not differ from the noise, it will be ignored. Without use of this algorithm, in case of receipt of the preamble being −40 dB at the reference frequency, the transceiver (2) will "stuck" on this channel. This results in non-switching of the transceiver (2) to another channel and, thus, it becomes completely suppressed. Thus, introduction of the limitation (>6 dB) enables to significantly highlight the signal against the background of the average noise. It is possible to process the signal under these conditions only. To this end, the noise level is updated during each listening period, and if the preamble suppresses the signal, it will become the noise itself and the transceiver (2) will not react to it anymore.

Figure 7:
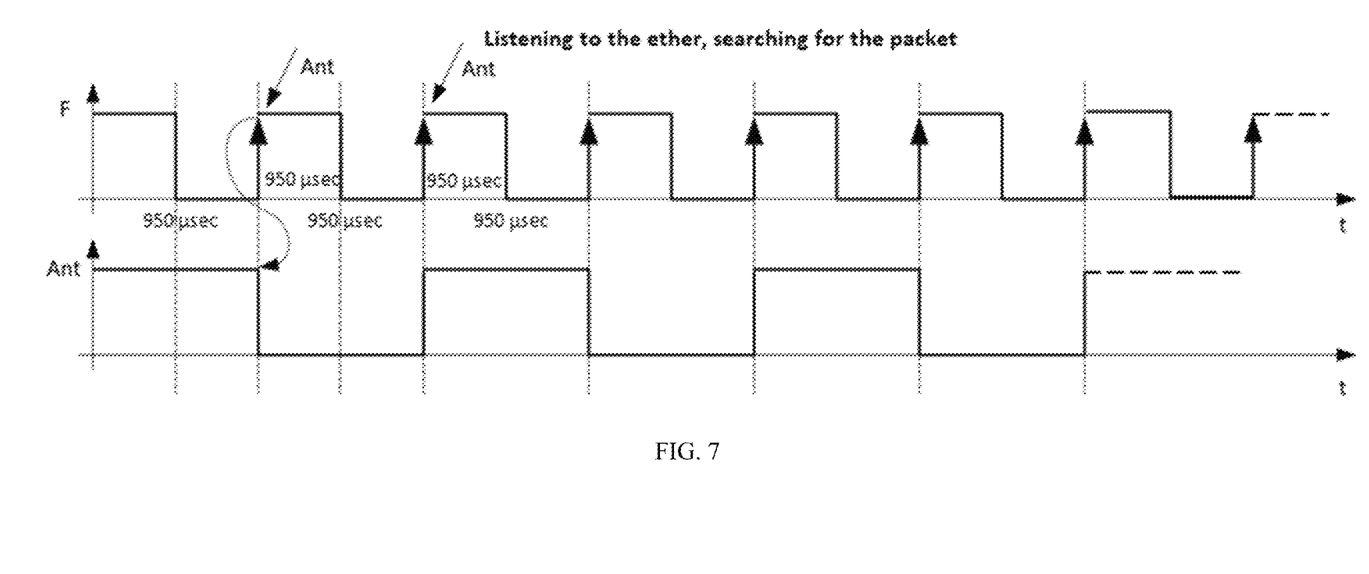
FIG. 7 is a time diagram of listening to a radio ether and searching for the packet by the transceiver.
Figure 8:
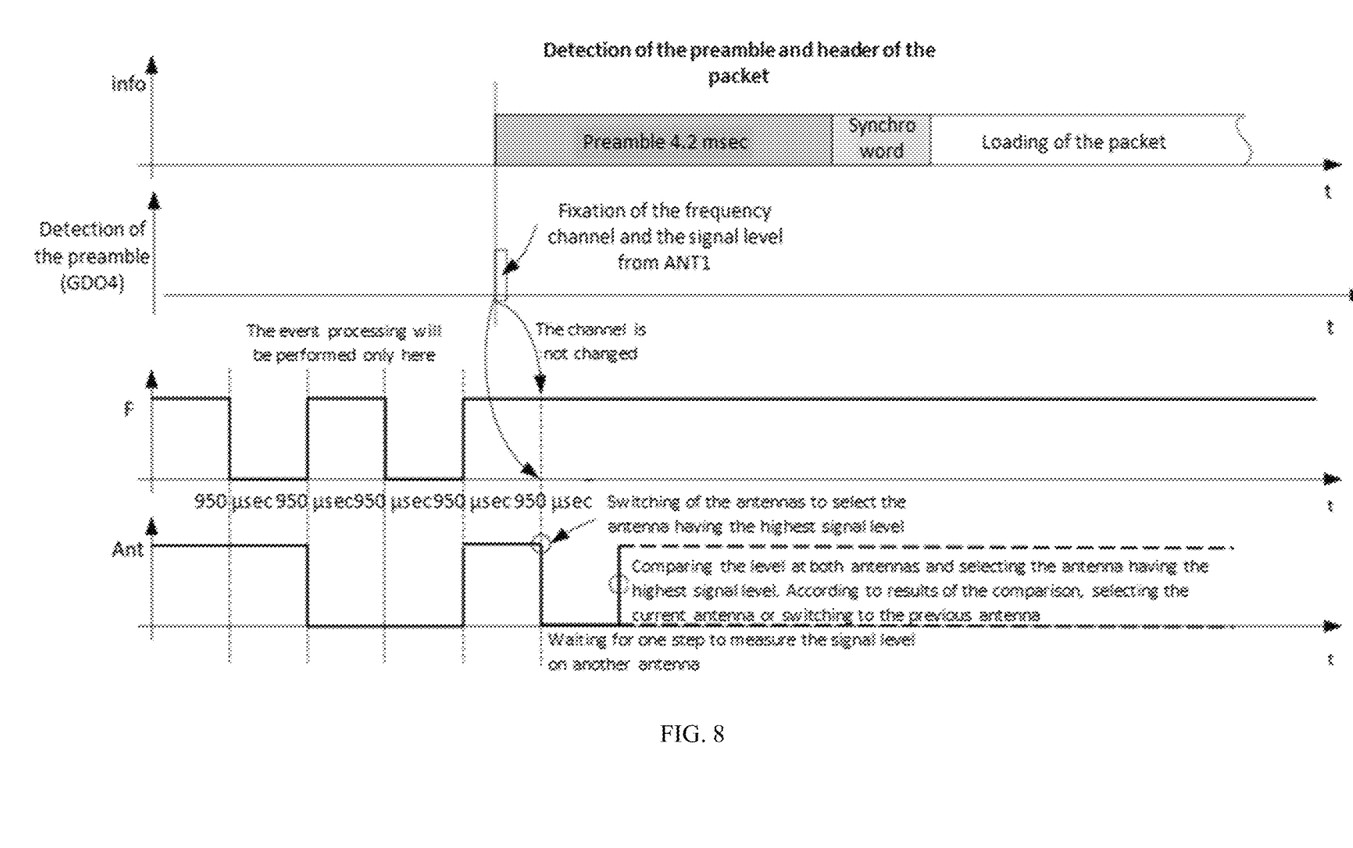
FIG. 8 is a time diagram of detecting the preamble and a header of the received packet.
Figure 9:
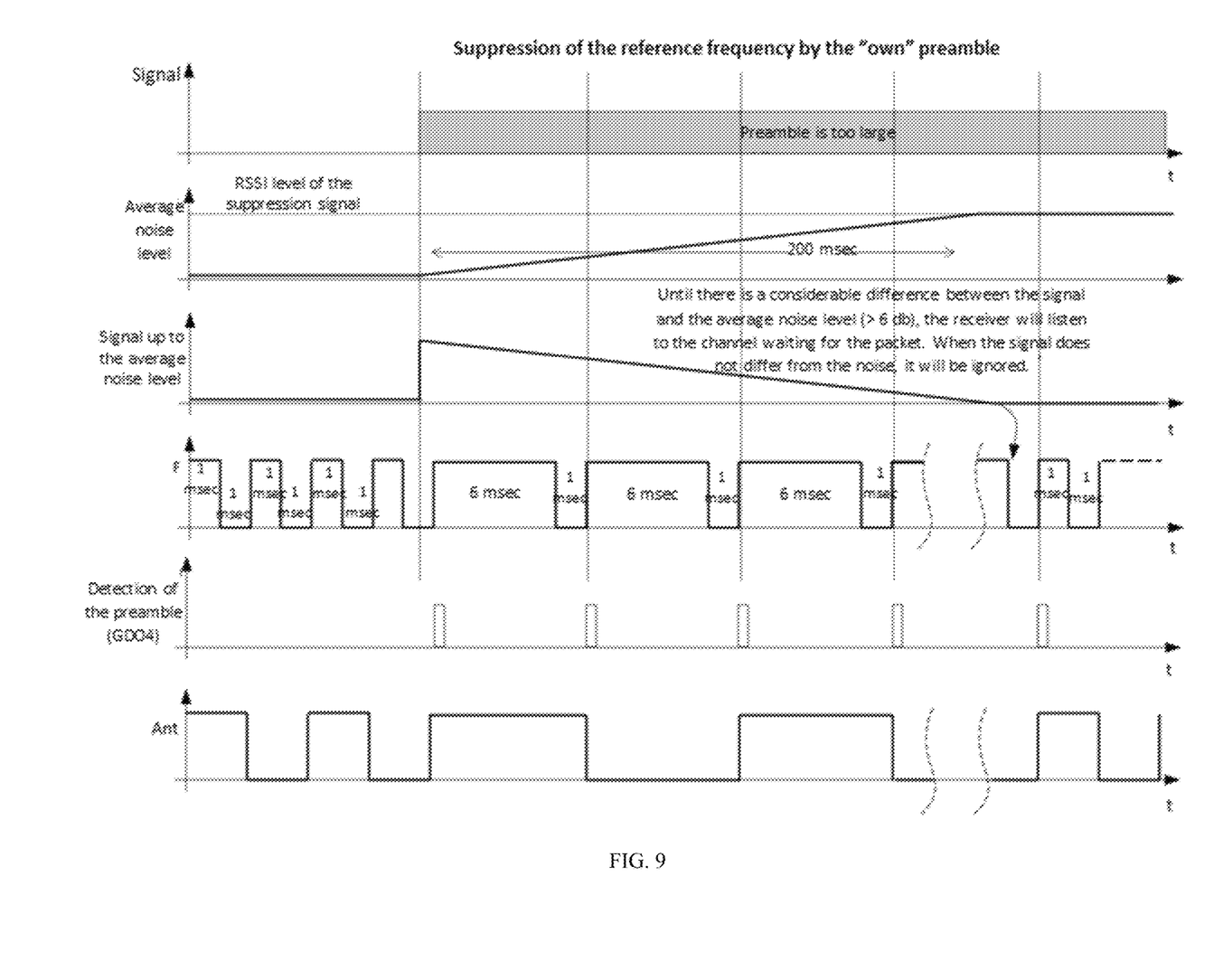
FIG. 9 is a time diagram of suppressing the reference frequency by the preamble of the received packet.

FIG. 7 illustrates steps of switching of the frequency F, upper diagram, and of the antenna by the microcontroller (6) transceiver (2), lower diagram. FIG. 8 illustrates the process for searching for the preamble by the transceiver (2), upper diagram, and its detection followed by fixation of the frequency and antenna having the maximum signal level, second diagram. FIG. 9 illustrates the preamble suppression protection algorithm.

The invention claimed is:

1. A method for a radio communication among a plurality of transceivers (1) and (2) of a safety or control system, the method comprising: broadcasting a radio signal, which comprises at least a preamble and a packet body, and searching for the preamble through a plurality of antennas k1 (5) of one transceiver (2) with an alternate periodical linking of each antenna (5) to search for the preamble; evaluating a quality of the radio signal as compared to a given level of the radio signal upon receipt of the preamble; and selecting an antenna (5) having a maximum level of the radio signal, through which a synchronization of the transceivers (1) and (2) is started to receive the packet body, characterized in that during the broadcasting of the radio signal, a radio frequency is periodically switched among a set of given radio frequencies k2, while during the alternate periodical linking of each antenna (5) to search for the preamble, the radio frequency is periodically switched among the radio frequencies from the set of given radio frequencies k2 for the linked antenna (5), wherein a minimum duration of the preamble for the broadcasting of the radio signal is determined by a ratio $T1=(k1+k2)$ T, where T1 is a duration of the preamble broadcasting in msec, T is a duration of linking of one antenna (5) of the transceiver (2) at a single radio frequency in msec, wherein upon receipt of the preamble during selecting of the antenna (5) having the maximum level of the radio signal, a frequency, at which the preamble has been received, is assigned as a reference (carrier) frequency followed by synchronization of the transceivers (1) and (2) through the selected antenna (5) and the reference frequency.

2. The method according to claim 1, characterized in that the transceiver (2) having the plurality of antennas k1 (5), where k1 equals to 2, is used.

3. The method according to claim 2, characterized in that the transceiver (2) having the set of given radio frequencies k2 (5), where k2 equals to 2, is used.

4. The method according to claim 1, characterized in that the evaluation of the quality of the radio signal comprises a cyclic determination of a signal level at a current moment followed by a formation of an array of signal levels and a determination of a noise level among all the frequencies from the set of the given radio frequencies k2.

5. The method according to claim 1, characterized in that the evaluation of the quality of the radio signal comprises switching from the antenna (5) that has received the preamble to another antenna (5) in order to compare the signal level followed by selection of the antenna (5) having the maximum level of the radio signal.

6. The method according to claim 1, characterized in that the synchronization of the transceivers (1) and (2) comprises waiting for a synchro-word by the transceiver (2) that has received the preamble during the period T2 followed by reception of the packet body during the period T3.

7. The method according to claim 6, characterized in that after the period T2 has expired and in absence of the synchro-word or after the period T3 has expired, a cyclic search of the preamble is started.

8. A safety or control system with the method for the radio communication according to claim 1, the system comprising: a plurality of transceivers (1) and (2), each of them being configured to receive and to transmit a radio signal, wherein at least one transceiver (2) comprises a radio module (3) that is coupled to a high-frequency commutator (4) that has a set of outputs that is coupled to a plurality of antennas k1 (5); and a microcontroller (6) that is coupled to the radio module (3) and to the high-frequency commutator (4), wherein the radio module (3) is configured to operate at radio frequencies k2, and the microcontroller (6) is configured to periodically perform a cycle of searching for a preamble by:

loading the radio frequency from the set of given radio frequencies k2 to the radio module (3), linking the antenna (5) from the plurality of antennas k1 (5) through the high-frequency commutator (4) followed by searching for the preamble at the established radio frequency through the linked antenna (5), linking another antenna (5) from the plurality of antennas k1 (5) followed by searching for the preamble at the preliminary established radio frequency through the linked antenna (5), loading another radio frequency from the set of given radio frequencies k2 to the radio module (3) followed by searching for the preamble at the established radio frequency through the preliminary linked antenna (5), linking another antenna (5) from the plurality of antennas k1 (5) followed by searching for the preamble at the preliminary established radio frequency through the linked antenna (5), selecting the antenna (5) having a maximum level of the radio signal, at which the preamble has been received, and assigning the frequency, at which the preamble has been received, as a reference (carrier) frequency followed by synchronization of the transceivers through the selected antenna (5) and the reference frequency, wherein other transceivers (1) from the plurality of the transceivers are configured to broadcast the radio signal comprising at least the preamble and a packet body, wherein a minimum duration of the preamble for the broadcasting of the radio signal is determined by a ratio $T1=(k1+k2) T$, where $T1$ is a duration of the preamble broadcasting in msec, $T$ is a duration of linking of one antenna of the transceiver at a single radio frequency in msec.

9. The system according to claim 8, characterized in that the transceiver (2) comprises the plurality of antennas k1 (5), where k1 equals to 2.

10. The system according to claim 9, characterized in that the transceiver (2) comprises the microcontroller (6) having the set of given radio frequencies k2, where k2 equals to 2.

11. The system according to claim 8, characterized in that the microcontroller (6) is configured to evaluate a quality of the radio signal by cyclic determination of a signal level at a current moment followed by a formation of an array of signal levels and determination of a noise level among all the frequencies from the set of the given radio frequencies k2.

12. The system according to claim 11, characterized in that the microcontroller (6) is configured to switch the antenna (5) that has received the preamble to another antenna (5) in order to compare the signal level followed by selection of the antenna (5) having the maximum level of the radio signal.

13. The system according to claim 8, characterized in that the microcontroller (6) is configured to establish a period T2 for waiting for a synchro-word by the transceiver (2) that has received the preamble and a period T3 for receiving the packet body.

14. The system according to claim 13, characterized in that the microcontroller (6) is configured to restore a cycle of searching for the preamble after the period T2 has expired and in absence of the synchro-word or after the period T3 has expired.

* * * * *

UNITED STATES PATENT AND TRADEMARK OFFICE
CERTIFICATE OF CORRECTION

PATENT NO. : 11,949,476 B2  
APPLICATION NO. : 17/446403  
DATED : April 2, 2024  
INVENTOR(S) : Oleksandr Volodymyrovych Konotopskyi et al.

Page 1 of 1

It is certified that error appears in the above-identified patent and that said Letters Patent is hereby corrected as shown below:

On the Title Page

"(12) United States Patent  
Volodymyrovych et al."  
Should read:  
--(12) United States Patent  
Konotopskyi et al.--

"(72) Inventors: Konotopskyi Oleksandr Volodymyrovych, Sharjah (AE); Tantsiura Oleksandr Mykolayovych, Kyiv (UA); Piannikov Serhii Dmytrovych, Kyiv (UA)"  
Should read:  
--(72) Inventors: Oleksandr Volodymyrovych Konotopskyi, Sharjah (AE); Oleksandr Mykolayovych Tantsiura, Kyiv (UA); Serhii Dmytrovych Piannikov, Kyiv (UA)--

Signed and Sealed this  
Fourth Day of March, 2025

Coke Morgan Stewart  
*Acting Director of the United States Patent and Trademark Office*